G. A. JASPER.
Vacuum Pan.
No. 41,999.
Patented March 22, 1864.
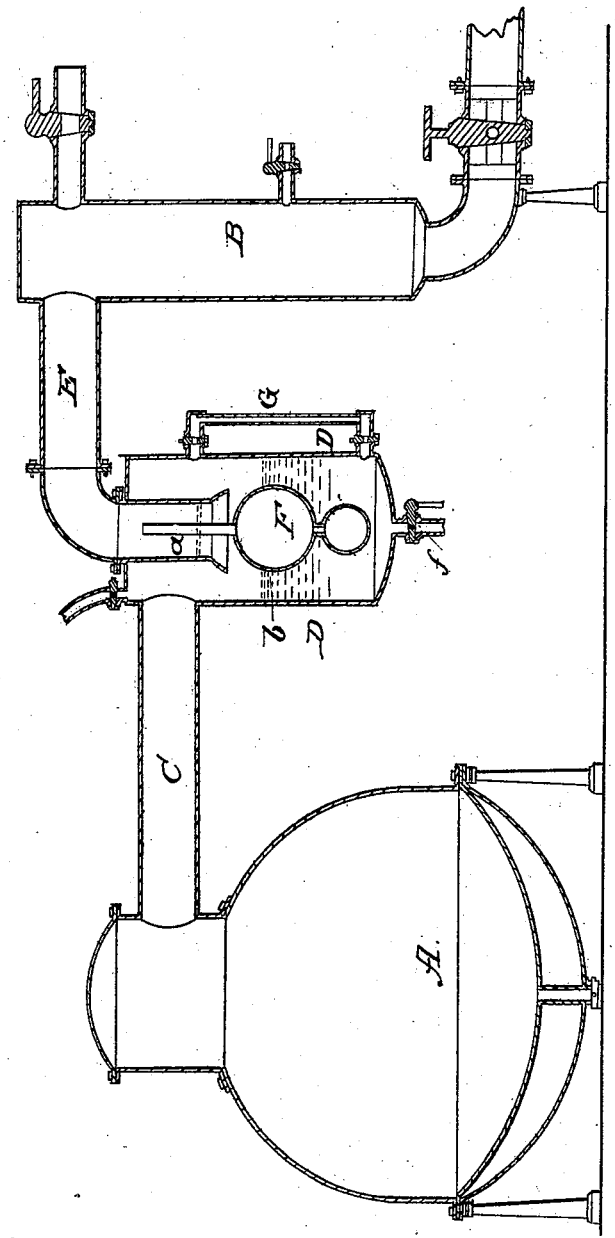

UNITED STATES PATENT OFFICE.

GUSTAVUS A. JASPER, OF CHARLESTOWN, MASSACHUSETTS.

IMPROVED APPARATUS FOR PREVENTING THE LOSS OF SUGAR DURING EVAPORATION.

Specification forming part of Letters Patent No. 41,999, dated March 22, 1864.

*To all whom it may concern:*

Be it known that I, GUSTAVUS A. JASPER, a resident of Charlestown, in the county of Middlesex and State of Massachusetts, have made a new and useful invention for preventing the loss of saccharine matter which usually results from overflowage occcasioned by overboiling of sirup in a vacuum-pan; and I do hereby declare the same to be fully described in the following specification, and represented in the accompanying drawing, which represents, in section, my apparatus as applied to an ordinary vacuum-pan and condenser used in sugar-refineries.

In the drawing, A denotes the vacuum-pan, and B the condenser for condensing vapors which proceed from such pan while sirup may be in a state of ebullition, *in vacuo*, in such pan. Instead of leading the eduction-conduit C of such vacuum-pan directly into the condensor, it is to be caused to open and discharge into a close vessel, D, out of which a pipe, E, is to lead and communicate with the condenser B, the said pipe E being open at its lower end, and made to descend within the vessel D, as shown in the drawing. Within the vessel D there is a float, F, the stem *a* of which should be suitably guided, so as to allow the float to move vertically within vessel or up to and away from the mouth of the pipe E, the said float being so made as to close the said mouth when it (the float) may be pressed up against the mouth. The vessel is to contain water or a suitable fluid, as shown at *b*, the upper surface of which should be low enough within the vessel D to enable the float F, under ordinary circumstances, to be sufficiently distant from the pipe E to allow of the usual flowage of vapor from the vacuum-pan A into the condenser B. A pipe, *c*, provided with a stopcock, *d*, opens into the upper part of the vessel D, there being also a discharging-faucet, *f*, leading out of the bottom of the vessel. Water is supplied to the vessel D through the pipe *e*, the fluid contents of the said vessel being discharged, either in whole or in part, as may be required, through the faucet *f*. A glass tube, G, communicates at its two ends with the interior of the vessel D, is arranged vertically alongside of the said vessel, as shown in the drawing, and serves to indicate at any time the depth of the liquid contents of the vessel.

It is often the case-that the ebullition in the vacuum-pan becomes so great as to cause the sirup to overflow from the said pan into the condenser, the amount of the overflow being carried off with the condensed steam and lost, the same creating a loss of much saccharine matter which it is the purpose of my invention to prevent.

In the operation of my invention, when such an overflowage of the sirup occurs, the liquid boiling over will run into the vessel D, instead of going directly into the condenser, and by adding to the liquid contents of such vessel D will raise the float F up to and so as to stop the mouth of the pipe E. As soon as this may have taken place, the vacuum-pumps will cease to draw air from the pan A. Consequently the vacuum-pan will not perform its office, and the pipe G will also show that the liquid is too high in the vessel D. The sirup which may be boiled over, instead of going into the condenser B, will be arrested by the vessel D, and with the water thereof may be extracted therefrom through the faucet *f*, fresh water being subsequently supplied to the vessel by means of the pipe *c*.

What I claim as my invention is—

The combination of the vessel D, its float F, and pipe E, with the vacuum-pan A, its conduit C, and the condenser B, the whole being arranged substantially in the manner and so as to operate as and for the purpose hereinbefore specified.

In testimony whereof I have hereunto set my signature.

GUSTAVUS A. JASPER.

Witnesses:
 GEORGE D. NOYES,
 F. P. HALE, Jr.